Sept. 18, 1934.  M. MUSGRAVE  1,974,118
TESTING MACHINE
Filed April 1, 1930   3 Sheets-Sheet 1
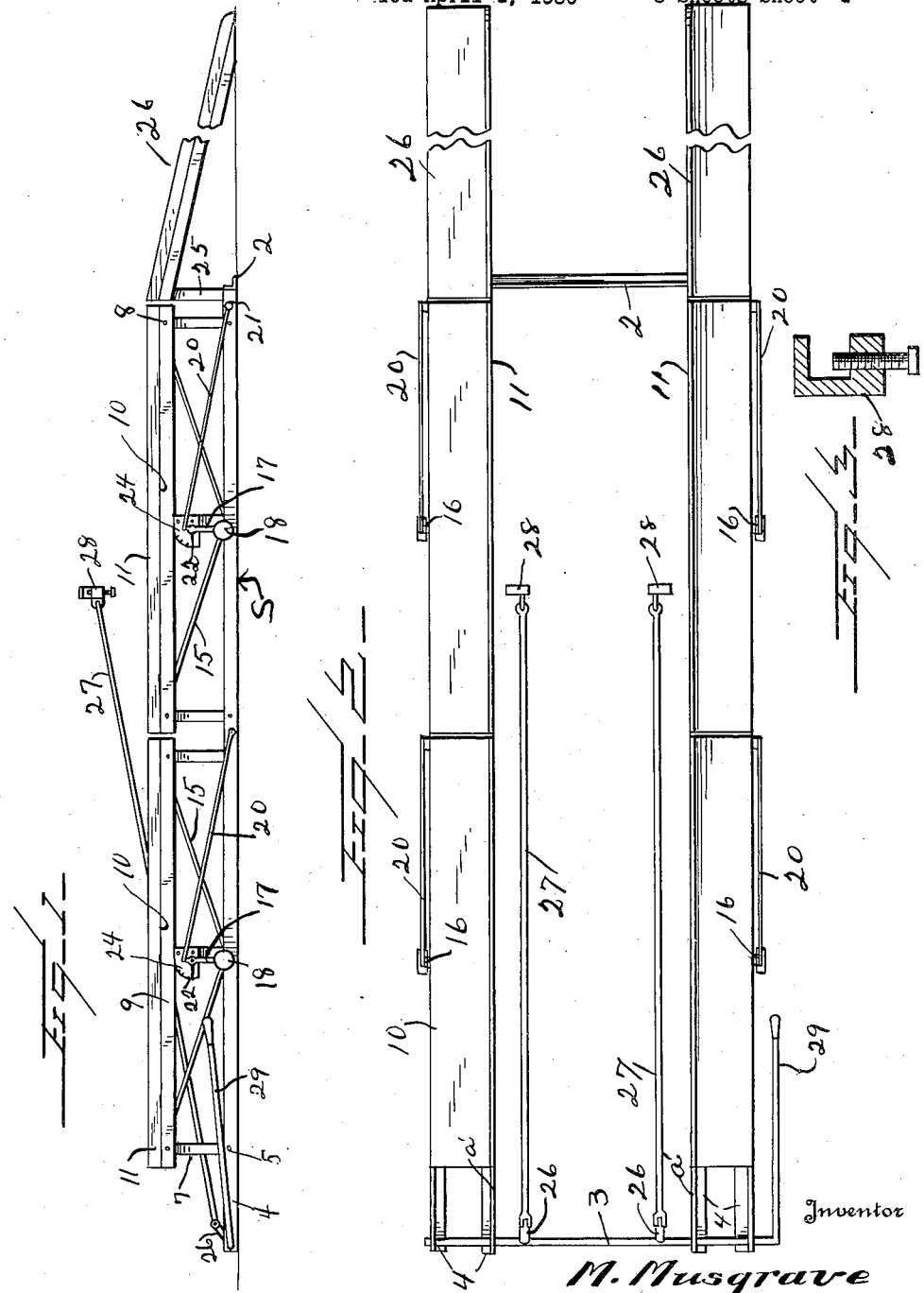

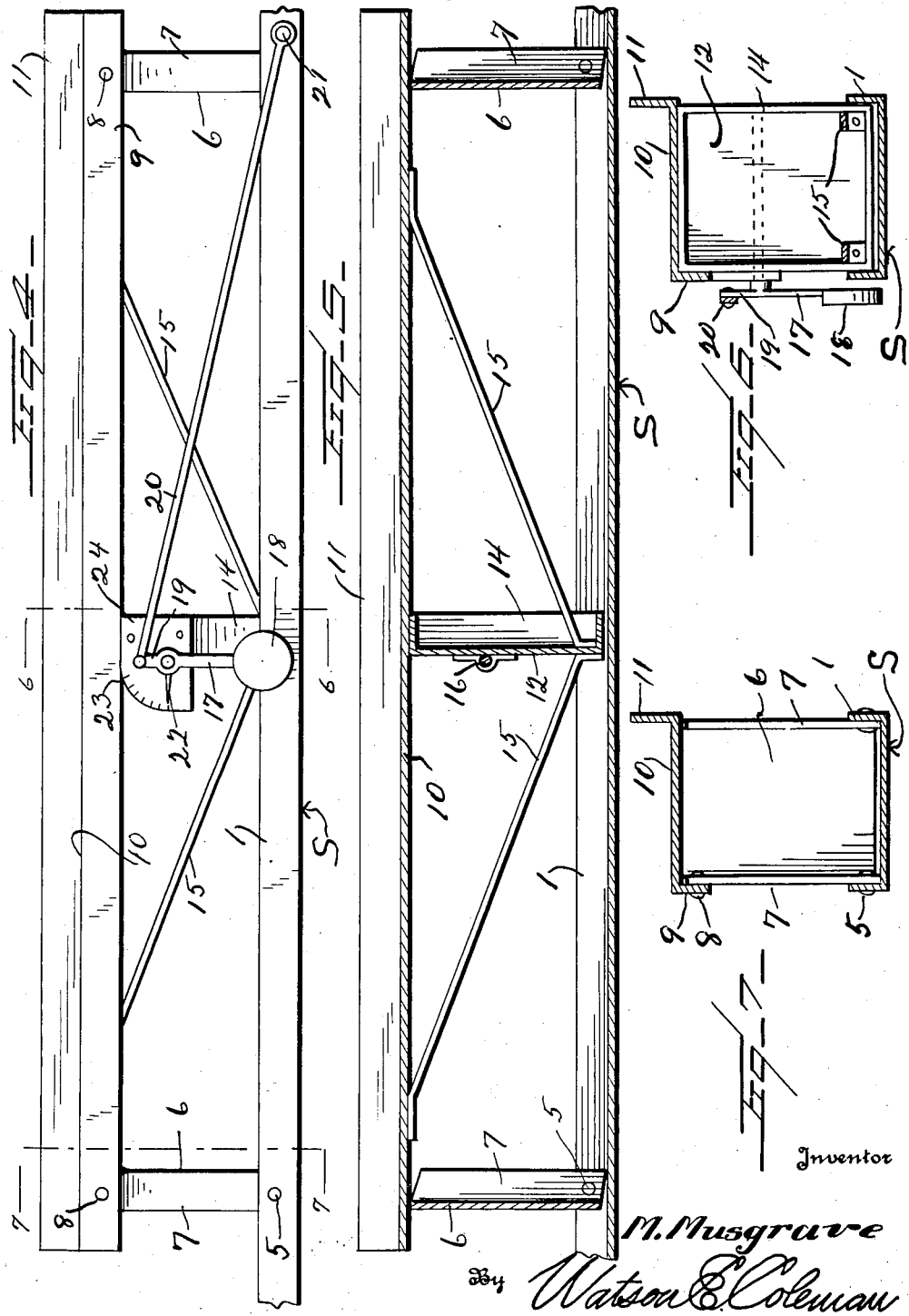

Sept. 18, 1934.  M. MUSGRAVE  1,974,118
TESTING MACHINE
Filed April 1, 1930   3 Sheets-Sheet 3
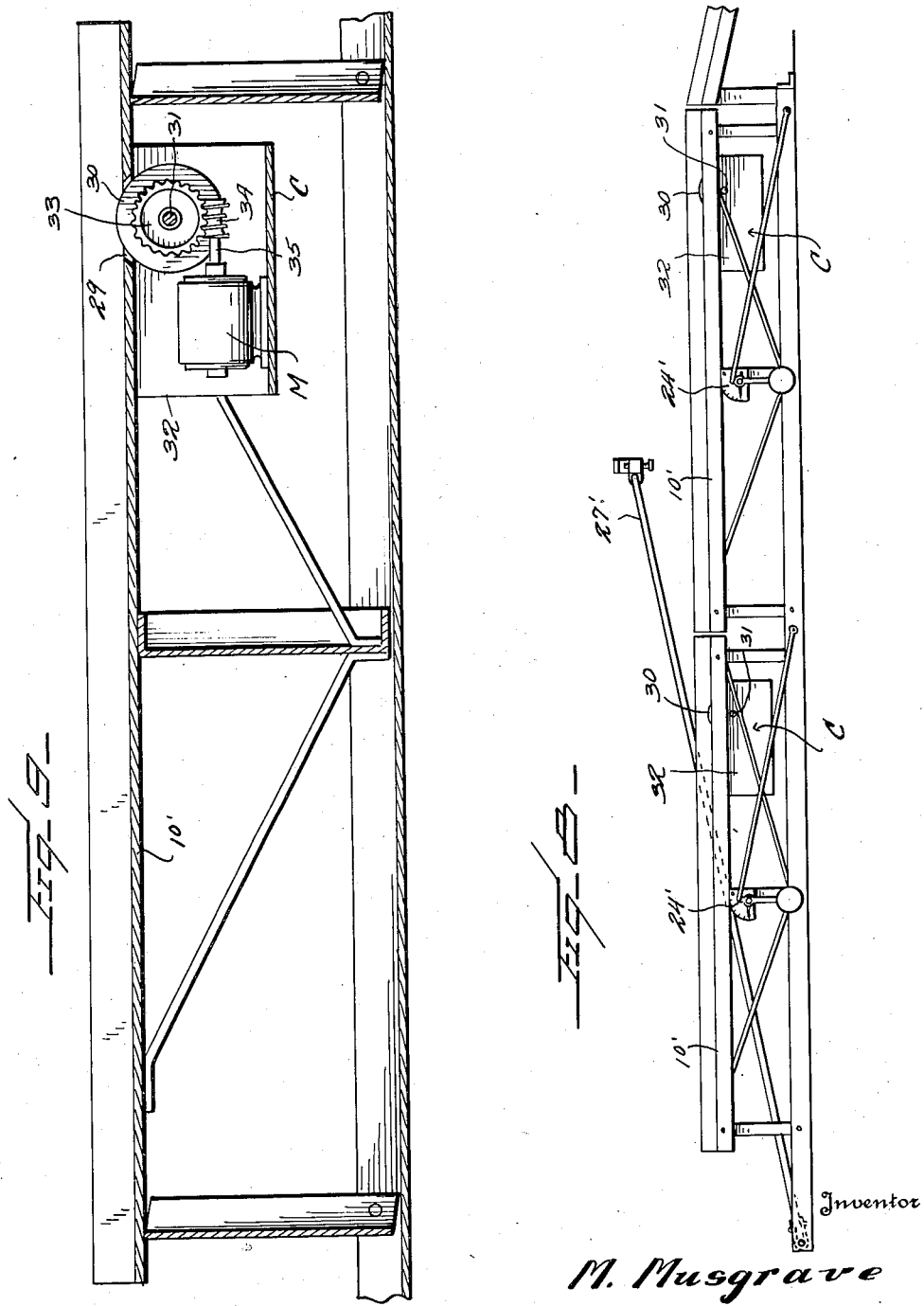

Patented Sept. 18, 1934

1,974,118

UNITED STATES PATENT OFFICE 1,974,118

TESTING MACHINE

Mark Musgrave, Pittsburg, Kans., assignor to Vanita H. Musgrave, Springfield, Ohio Application April 1, 1930, Serial No. 440,791

5 Claims. (Cl. 73—51)

This invention relates to testing machines, and it is an object of the invention to provide a device of this kind wherein in a testing operation a connection is had between the machine and frame of the vehicle being tested, thus assuring an accurate test of the brakes due to the fact that the vehicle frame is pulled over both axles of the vehicle just the same as when the brakes are applied on a road.

Another object of the invention is to provide a machine of this kind operating in a manner to eliminate the liability of inaccuracy which would result by connection of the testing machine with the vehicle at the front spring or other parts of the vehicle and which would present loss motion or play tending to throw the front wheels out of adjustment during a testing operation.

The invention consists in the details of construction and in the combination and arrangement of the several parts of my improved testing machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation of a testing apparatus constructed in accordance with an embodiment of my invention, one of the connecting rods being shown in position for coupling to the frame of the vehicle being tested;

Figure 2 is a view in top plan of the structure as illustrated in Figure 1;

Figure 3 is a detailed view partly in section and partly in elevation of the coupling member carried by the outer end portion of each of the connecting rods as herein embodied;

Figure 4 is an enlarged fragmentary view in side elevation of the device as illustrated in Figure 1;

Figure 5 is a longitudinal sectional view taken through a side portion of the machine as illustrated in Figure 1;

Figure 6 is a transverse sectional view taken through one of the side members of the machine as indicated by the line 6—6 in Figure 4;

Figure 7 is a transverse sectional view taken through one of the side members of the machine as indicated by the line 7—7 in Figure 4;

Figure 8 is a view in side elevation illustrating a further embodiment of my invention;

Figure 9 is a longitudinal sectional view taken through a side portion of the device as illustrated in Figure 8 and at one extremity thereof.

As disclosed in the accompanying drawings, my improved machine includes a base frame 60 herein disclosed as comprising a pair of transversely spaced parallel sills S preferably of channel iron provided with the upstanding marginal flanges 1. The sills at one end are connected by a cross member 2 and at their opposite ends 65 by a rock shaft 3. This shaft 3 is rotatably supported by the upstanding flanges a' comprised in the extension arms 4 of the sills S proper. It is also to be understood that the sills S may be further connected and maintained in desired 70 spaced relation in any way which best complies with the requirements of practice.

At predetermined points spaced lengthwise thereof the flanges 1 of each of the sills S has pivotally engaged therebetween, as at 5, an upstanding plate 6, the pivotal connections 5 being direct with the flanges 7 defining the vertical margins of the plate 6.

In the present embodiment of my invention the plates 6 are associated in pairs and the plates 6 80 of each pair have their upper portions pivotally connected, as at 8, with a depending flange 9 defining the outer longitudinal marginal portion of a track 10. The inner marginal portion of the track 10 is defined by an upstanding flange 85 11. This mounting of a track 10 permits the same to have swinging or oscillating movement with respect to its associated sill S and the extent of such swinging or oscillating movement, as herein disclosed, is limited by contact with 90 the sill S of the plate 12 depending from the central portion of the track 10. This plate 12 has its marginal portions defined by the outstanding flanges 14 to assure the same having requisite strength and rigidity, and to further 95 reinforce or brace the plate 12 the lower portion thereof and the opposite end portions of the track 10 are connected by the struts 15.

It is also to be noted that the opposite extremities of the flanges 7 of the plates 6 are 100 so inclined as to permit the requisite swinging or oscillating movement of the track 10.

Each of the plates 12 rotatably supports a shaft 16 which extends beyond the outer side of the plate 12 and said extremity has fixed 105 thereto a rigid depending rock arm 17, the free end portion of which carrying a weighted member 18. The arm 17 is continued by an upwardly disposed complemental arm 19 to which is pivotally engaged an end portion of a rod 20, 110 the opposite end portion of which being pivotally connected, as at 21, to a flange 1 of the associated sill at a desired point in advance of the arm 17.

Extending outwardly from the arm 17 and radial to the shaft 16 is a pointer or index 22 coacting with graduations provided on the plate 24 fixed to the adjacent flange 14 of the plate 12. As the track 10 swings or oscillates the pointer or index 22 will coact with the graduations 23 to give indication of the desired register of a particular wheel during a testing operation.

As herein disclosed, each of the sills S has associated therewith a pair of tracks 10 and in practice a single wheel of a car to be tested is engaged upon each track.

The sills S at the forward ends thereof are provided with the upstanding posts 25 providing suitable support for the ramps 26 whereby the vehicle may be readily positioned upon the tracks 10.

The shaft 3 inwardly of but in relatively close proximity to the sills S is provided with the upstanding rock arms 26 to which are pivotally engaged extremities of the elongated rods 27. The opposite or free end portions of the rods 27 carry the clamp members 28 of a construction or type whereby said forward or free end portions of the rods 27 may be effectively engaged with the side members of the frame of the vehicle or suitable parts rigid with the frame.

With the vehicle properly placed upon the tracks 10 and with the brakes applied rocking movement is imposed upon the shaft 3 to cause the arms 27 to impose pull upon the vehicle. Just so long as the brakes hold the tracks 10 will swing or oscillate downwardly and the various pointers 22 will give proper indication thereof. However, if the brakes of a vehicle are not properly adjusted with respect to all of the wheels, the wheel in connection with which the braking action first becomes ineffective will roll over its track and this, of course, will be readily indicated by the proper pointer or index 22 so that the mechanic can determine just what is necessary to be done. It is believed to be clearly apparent that in the tester as herein disclosed the four pointers 22 will move forward each in proportion to the amount of braking power of each wheel and if the test is normal an adjustment can soon be made of the brakes so that all of the pointers or indices 22 will stand at the same pressure as the vehicle is pulled along.

If the brake lining should be glazed the pointers or indices will chatter or jump according to the amount of glaze and if the brake drum is out of order or egg shape enough to affect the braking, the concomitant pointer or index 22 will indicate increase pressure until the wheel slips on the track. If the brake linings are greasy the pointers or indices 22 will stand perfectly still at a very low pressure.

In the present embodiment of my invention an end portion of the shaft 3 is provided with an operating lever 29 permitting a ready and effective manual operation of the machine.

By using the rods 27, which may also be termed draw bars, and by connecting said rods or bars direct to the vehicle frame or parts rigid therewith, an exact road condition is obtained in making a test as it is not required to first take up the slack which would occur if the rods or bars 27 were connected with an axle or springs of the vehicle.

It is to be further noted that these pull rods or bars 27 when in engagement with the frame of a vehicle are substantially in parallelism and result in the frame being held rigid when pulled along the tracks 10, square and evenly regardless of whether the brakes happen to be holding all on one side of the car or not and whether the frame is weak or loose in the rivets.

In the embodiment of my invention as illustrated in Figures 8 and 9, the forward end portion of each of the tracks 10' is provided with an opening 29 through which partially extends from below a roller 30. This roller 30 is fixed to a shaft 31 rotatably supported by the side walls 32 of a casing C depending from the track 10'. The shaft 31, as herein disclosed, also has fixed thereto a worm wheel 33 meshing with a worm 34 carried by the drive shaft 35 of an electric motor M.

In the operation of this form of device the car is placed or positioned upon the rollers 30 and each of the rods 27' is attached to the frame of the car. These rods 27' do not pull the car but hold it rigid on top of the rollers. Each of the rollers 30 is then caused to rotate upon proper operation of the motor M and when the car brake is applied each roller 30 and track 10' tries to kick-out from under the wheel according to the amount each brake holds. The forward movement of the track results in the desired register of a dial or plate 24' as has hereinbefore been set forth with respect to the first embodiment of my invention.

It is to be understood that by varying the position of the roller 30 lengthwise of its trackway 10', the device may be adapted or adjusted for use in connection with vehicles of varying wheel bases.

From the foregoing description it is thought to be obvious that a testing machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A brake tester comprising independently movable trackways each adapted to support a vehicle wheel, means to measure the movement thereof as the vehicle wheel is moved thereover with its brake applied, an operating member, pull rods operatively engaged with said operating member, and means for connecting said pull rods to the opposite sides of the vehicle frame to hold the frame rigid and to assure the frame being evenly pulled along the trackways.

2. A brake tester comprising independently movable trackways, means to measure the movement thereof, a base frame, normally upright supports pivotally secured to the trackways and the frame, and a member dependingly secured to each trackway for movement therewith and engageable with the frame to limit the movement of the trackways toward the frame.

3. A brake tester comprising a base frame, independently movable trackways, upright supports pivotally connected at one end to the frame and at the opposite end to the trackways for supporting the trackways above the frame, said supports having downwardly inclined upper end portions and upwardly inclined lower end portions whereby to limit the rocking movement of the supports relative to the frame and the trackways, means carried by the trackways and adapted for engagement with the frame upon movement of the trackways in one direction to limit the movement of the trackways, and force measuring means operatively connected to said trackways to measure the force tending to move the trackways during the test.

4. A brake tester comprising independent trackways each adapted to support a vehicle wheel, means for supporting each trackway for swinging movement in a general vertical direction, a member carried by each trackway for limiting the downward swinging movement of the trackway, and a force measuring means operatively mounted upon said member to measure the force tending to move the trackway during the test.

5. A brake tester comprising a base frame, a trackway, means for supporting said trackway on the base frame for movement in a general direction lengthwise of the trackway, a weighted rock arm operatively supported by the trackway, a rod operatively connected with the rock arm and the base frame so that movement of the trackway relative to the frame causes swinging of the rock arm, a pointer carried by the rock arm, said trackway carrying force measuring indications with which the pointer coacts.

MARK MUSGRAVE.